(12) United States Patent
Walker

(10) Patent No.: US 11,268,562 B2
(45) Date of Patent: Mar. 8, 2022

(54) NUT PLATE ASSEMBLY

(71) Applicant: THE BOEING COMPANY, Chicago, IL (US)

(72) Inventor: Steven Paul Walker, Arlington, WA (US)

(73) Assignee: THE BOEING COMPANY, Chicago, IL (US)

( * ) Notice: Subject to any disclaimer, the term of this patent is extended or adjusted under 35 U.S.C. 154(b) by 382 days.

(21) Appl. No.: 16/537,805

(22) Filed: Aug. 12, 2019

(65) Prior Publication Data
US 2021/0048058 A1 Feb. 18, 2021

(51) Int. Cl.
F16B 37/04 (2006.01)

(52) U.S. Cl.
CPC .......... *F16B 37/044* (2013.01); *F16B 37/045* (2013.01); *F16B 37/04* (2013.01)

(58) Field of Classification Search
CPC ...... F16B 5/0208; F16B 37/04; F16B 37/044; F16B 37/045; F16B 37/046; F16B 41/002
USPC ................. 411/81, 84, 85, 103–104
See application file for complete search history.

(56) References Cited

U.S. PATENT DOCUMENTS

| | | | |
|---|---|---|---|
| 2,299,158 A | 10/1942 | Luce | |
| 2,879,820 A * | 3/1959 | Trzcinski | B64C 1/06 411/84 |
| 3,020,946 A | 2/1962 | Mills | |
| 3,164,191 A | 1/1965 | Grimm et al. | |
| 3,483,910 A * | 12/1969 | La Londe et al. | F16B 37/046 411/112 |
| 3,669,171 A * | 6/1972 | Yavitch | E03D 11/16 411/131 |
| 4,015,390 A * | 4/1977 | Howorth | E04B 2/967 52/772 |
| 4,488,844 A | 12/1984 | Baubles | |
| 4,790,701 A | 12/1988 | Baubles | |
| 4,895,484 A | 1/1990 | Wilcox | |
| 4,948,313 A * | 8/1990 | Zankovich | E04B 1/4107 411/103 |
| 5,655,865 A * | 8/1997 | Plank | F16B 37/045 411/85 |

(Continued)

FOREIGN PATENT DOCUMENTS

FR 2983268 A1 5/2013

OTHER PUBLICATIONS

Extended European Search Report for corresponding EP Application No. 20190055.2-1010 dated Jan. 13, 2021.

*Primary Examiner* — Roberta S Delisle
(74) *Attorney, Agent, or Firm* — The Small Patent Law Group LLC; Jay J. Hoette

(57) ABSTRACT

A nut plate assembly includes a base plate having base plate openings. The nut plate assembly includes channel fittings coupled to the bottom of the base plate each having a main body with a top facing the bottom of the base plate. Each channel fitting has a nut cap channel at the bottom of the main body aligned with the opening in the main body. The nut plate assembly includes nut caps received in the nut cap channels coupled to the channel fittings and positioned below the bottom of the main body. Each nut cap has a pocket holding a nut to receive a fastener used to secure the base plate to the mounting structure from an exterior surface of the mounting structure through the base plate and the main body of the channel fitting.

20 Claims, 5 Drawing Sheets

(56) References Cited

U.S. PATENT DOCUMENTS

| | | | |
|---|---|---|---|
| 6,146,071 A * | 11/2000 | Norkus | F16B 37/044 |
| | | | 296/187.09 |
| 7,309,200 B2 * | 12/2007 | Schmieder | F16B 37/044 |
| | | | 411/103 |
| 8,911,191 B2 * | 12/2014 | James | B64C 1/00 |
| | | | 411/172 |
| 2007/0048107 A1 * | 3/2007 | Johnson | F16B 37/062 |
| | | | 411/113 |
| 2009/0129885 A1 | 5/2009 | Csik et al. | |
| 2014/0283363 A1 | 9/2014 | Wilkerson | |
| 2015/0316091 A1 | 11/2015 | James et al. | |
| 2018/0057142 A1 * | 3/2018 | Wilkerson | B64D 45/02 |

* cited by examiner

NUT PLATE ASSEMBLY

BACKGROUND

The subject matter herein relates generally to aircraft assembly.

During assembly of a vehicle, such as an aircraft, various structures are secured together, such as using fasteners. For example, a wing assembly of an aircraft includes wing panels that are secured to wing spars or other internal structures of the wing assembly. Many fasteners are used to secure the wing panel to the wing spar. When using threaded fasteners, a nut is held in the interior of the wing assembly while the fastener is fastened from the exterior of the wing assembly. The installer typically needs to access the interior of the wing assembly to position and hold the nut during the fastening process. Assembly of the wing panel to the wing spar is a time-consuming process. Additionally, the interior space of the wing assembly is not easily accessible. Furthermore, as wing assemblies are designed to be thinner, the amount of space for access by the installer is limited.

BRIEF DESCRIPTION

In one example, a nut plate assembly is provided including a base plate having a top and a bottom. The top is configured to face an inner surface of a mounting structure. The base plate has base plate openings therethrough. The base plate has first and second sides. The base plate has a front edge and a rear edge. The nut plate assembly includes channel fittings coupled to the bottom of the base plate. Each channel fitting includes a main body having a top and a bottom. The top of the main body faces the bottom of the base plate. The main body has an opening aligned with the corresponding base plate opening in the base plate. Each channel fitting has a nut cap channel at the bottom of the main body aligned with the opening in the main body. The nut plate assembly includes nut caps coupled to the channel fittings and positioned below the bottom of the main body. The nut caps are received in the nut cap channels of the channel fittings. Each nut cap has a pocket open at a top of the nut cap holding a nut aligned with the opening in the main body and the corresponding base plate opening to receive a fastener used to secure the base plate to the mounting structure from an exterior surface of the mounting structure through the base plate and the main body of the channel fitting.

In another example, a nut plate assembly is provided including a base plate having a top and a bottom. The top is configured to face an inner surface of a mounting structure. The base plate has base plate openings therethrough. The base plate has first and second sides and a front edge and a rear edge. The base plate has a reinforcement lip at the front edge forming a seal groove. The nut plate assembly includes a base plate seal received in the seal groove configured to seal between the base plate and the mounting structure. The nut plate assembly includes channel fittings coupled to the bottom of the base plate. Each channel fitting includes a main body having a top and a bottom. The top of the main body faces the bottom of the base plate. The channel fitting has a front support wall extending along and supporting the reinforcement lip of the base plate. The main body has an opening aligned with the corresponding base plate opening in the base plate. Each channel fitting has a nut cap channel at the bottom of the main body aligned with the opening in the main body. The nut plate assembly includes nut caps received in the nut cap channels of the channel fittings. Each nut cap has a pocket holding a nut aligned with the opening in the main body and the corresponding base plate opening to receive a fastener used to secure the base plate to the mounting structure.

In another example, a wing assembly is provided including a wing spar having a spar flange including an inner surface and an outer surface and having spar flange openings. The wing assembly includes a wing panel having an inner surface and an outer surface. The inner surface of the wing panel faces the outer surface of the spar flange and having wing panel openings aligned with the spar flange openings. The wing assembly includes a nut plate assembly extending along the inner surface of the spar flange. The nut plate assembly includes a base plate having a top and a bottom with the top facing the inner surface of the spar flange. The base plate has base plate openings aligned with the spar flange openings. The base plate has first and second sides and a front edge and a rear edge. The nut plate assembly includes channel fittings coupled to the bottom of the base plate. Each channel fitting includes a main body having a top and a bottom with the top of the main body facing the bottom of the base plate. The main body has an opening aligned with the corresponding base plate opening. Each channel fitting has a nut cap channel at the bottom of the main body aligned with the opening in the main body. The nut plate assembly includes nut caps coupled to the channel fittings and positioned below the bottom of the main body. The nut caps are received in the nut cap channels of the channel fittings. Each nut cap has a pocket open at a top of the nut cap holding a nut aligned with the opening in the main body. The wing panel includes fasteners passing through the wing panel openings, the spar flange openings and the main body openings into the nut caps from an exterior surface of the wing panel, the fasteners secured to corresponding nuts of the nut plate assembly to secure the wing panel to the wing spar flange.

DETAILED DESCRIPTION

Figure 1:
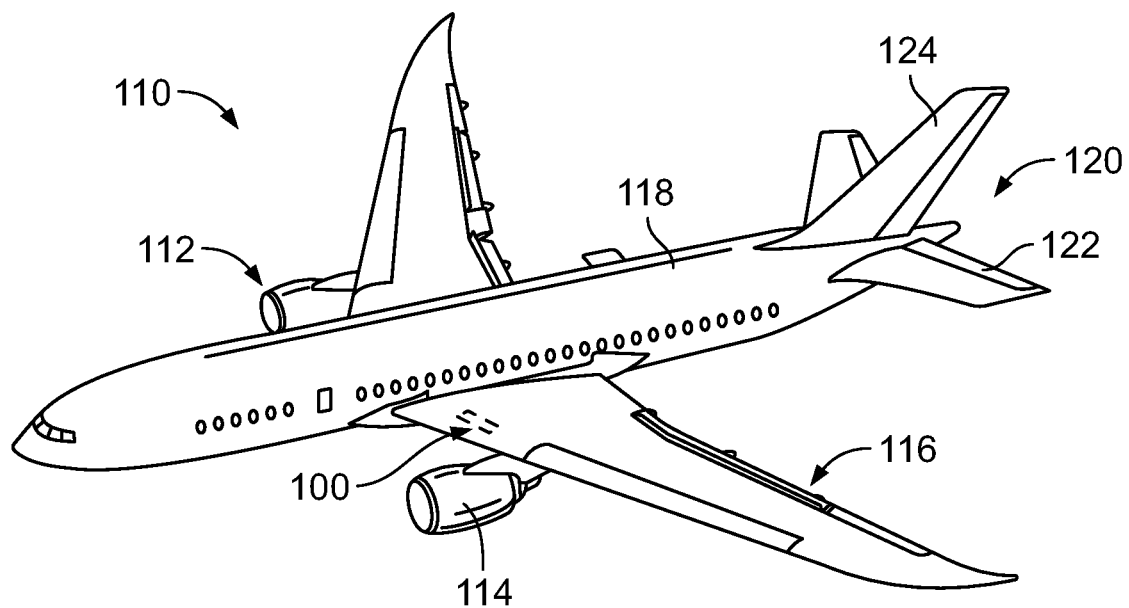
FIG. 1 illustrates a perspective front view of an aircraft according to an example of the present disclosure.

FIG. 1 illustrates a perspective front view of an aircraft 110 according to an example of the present disclosure. The aircraft 110 is an example of a vehicle with which a nut plate assembly 100 according to an example of the present disclosure may be utilized. Alternatively, instead of the aircraft 110, examples of the present disclosure may be used with various other vehicles, such as automobiles, buses, locomotives and train cars, seacraft, spacecraft, and the like.

The aircraft 110 includes a propulsion system 112 that may include two turbofan engines 114, for example. Optionally, the propulsion system 112 may include different engines or more engines 114 than shown. The engines 114 are carried by wing assemblies 116 of the aircraft 110 connected to a fuselage 118 of the aircraft 110. In various examples, the nut plate assemblies 100 may be used for mechanically connecting together various structures of the wing assemblies 116. The nut plate assemblies 100 may be used on other structures of the aircraft 110, such as for structures of the fuselage 118. The engines 114 may be carried by a fuselage 118 and/or an empennage 120 in other examples. The empennage 120 may also support horizontal stabilizers 122 and a vertical stabilizer 124.

The fuselage 118 of the aircraft 110 defines an internal cabin, which includes a cockpit, one or more work sections (for example, galleys, personnel carry-on baggage areas, and the like), one or more passenger sections (for example, first class, business class, and coach sections), and an aft section. Each of the sections may be separated by a cabin transition area.

Figure 2:
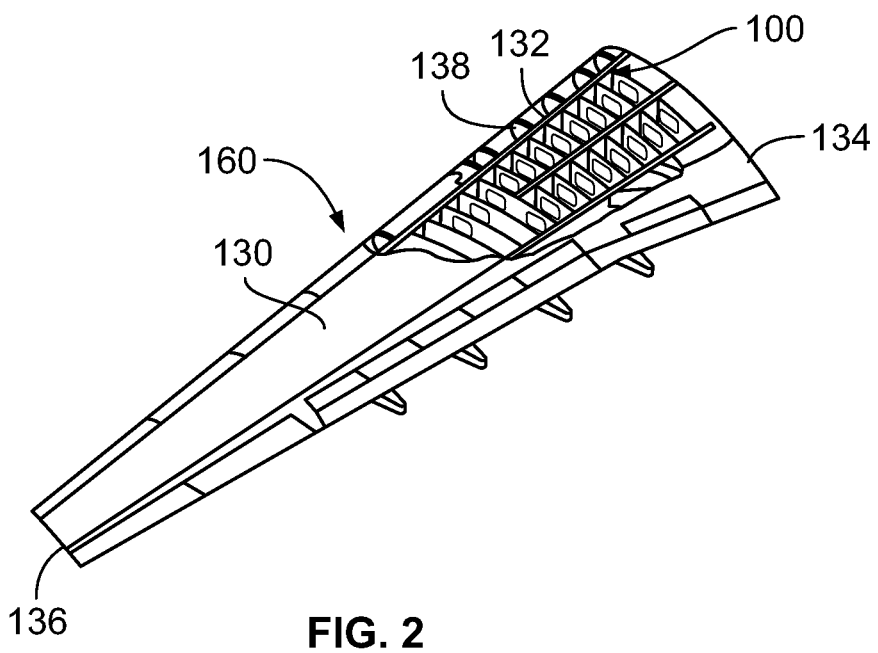
FIG. 2 is a partial sectional view of a wing assembly of the aircraft in accordance with an example.

FIG. 2 is a partial sectional view of one of the wing assemblies 116. The wing assembly 116 includes an inner structure and an outer structure. The outer structure includes wing panels 130 forming outer surfaces of the wing assembly 116. The inner structure includes wing spars 132 extending lengthwise at least partially between a root 134 and a tip 136 of the wing assembly 116. The inner structure includes wing ribs 138 extending between the wing spars 132. Various system components of the aircraft 110 may be arranged within the interior of the wing assembly 116. For example, mechanical and electrical components, such as for operating wing flaps, may be routed through the inner structure of the wing assembly 116. Components of a fuel system, such as fuel tanks, fuel lines, fuel valves and the like may be contained within the inner structure of the wing assembly 116. The wing panels 130 cover and enclose the inner structure and the components of the wing assembly 116.

In an example, the nut plate assemblies 100 are used to couple various structures of the wing assembly 116. For example, the nut plate assemblies 100 may be used to connect the wing panels 130 to the wing spars 132. The nut plate assemblies 100 hold nuts at proper locations for receiving fasteners, such as threaded fasteners, used to couple together the structures of the wing assembly 116. The fasteners are secured from the exterior surface of the wing assembly 116. The wing panel 130 is positioned over the wing spar 132 to cover and close out the wing assembly 116 restricting access to the inner structure. The nut plate assemblies 100 are arranged within the interior of the wing assembly 116 in the fasteners are coupled to the nut plate assemblies 100 from the exterior surface of the wing panel 130. The nut plate assemblies 100 hold the nuts in position to receive the fasteners without the need for the installer to enter or access the interior of the wing assembly 116.

Figure 3:
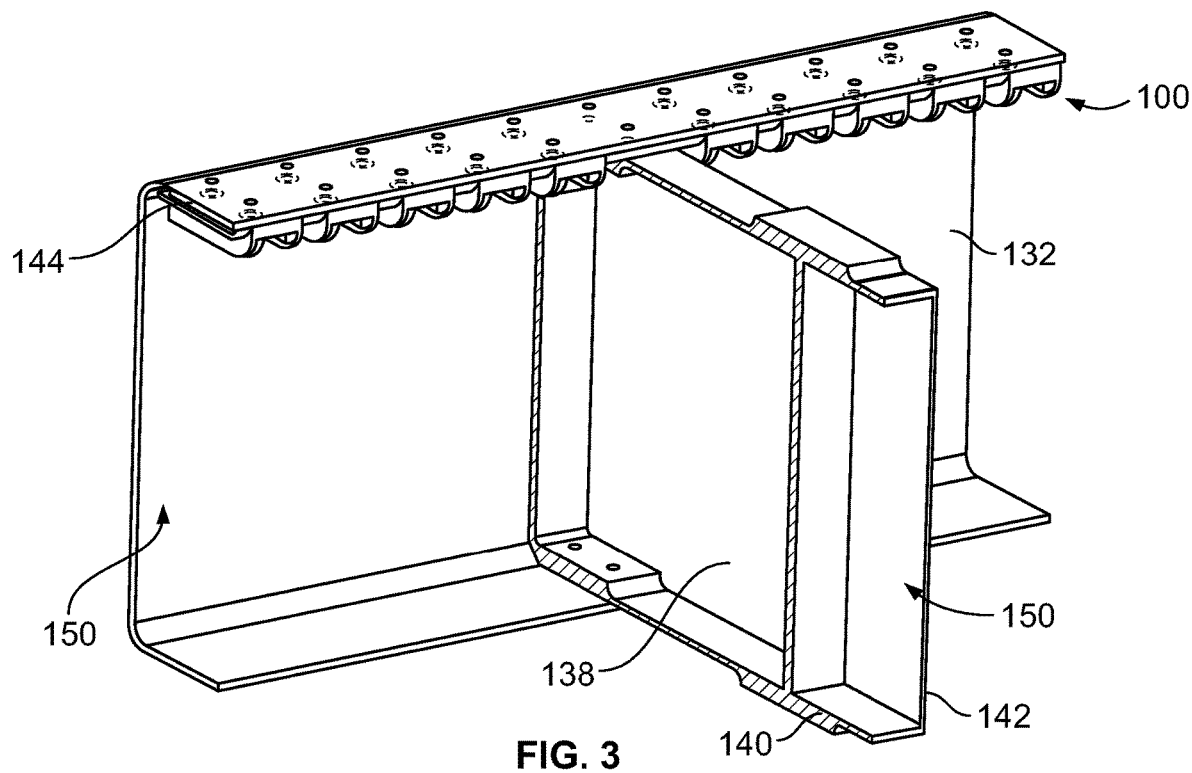
FIG. 3 is a top perspective view of a nut plate assembly of the wing assembly in accordance with an example positioned relative to mounting structures.
Figure 4:
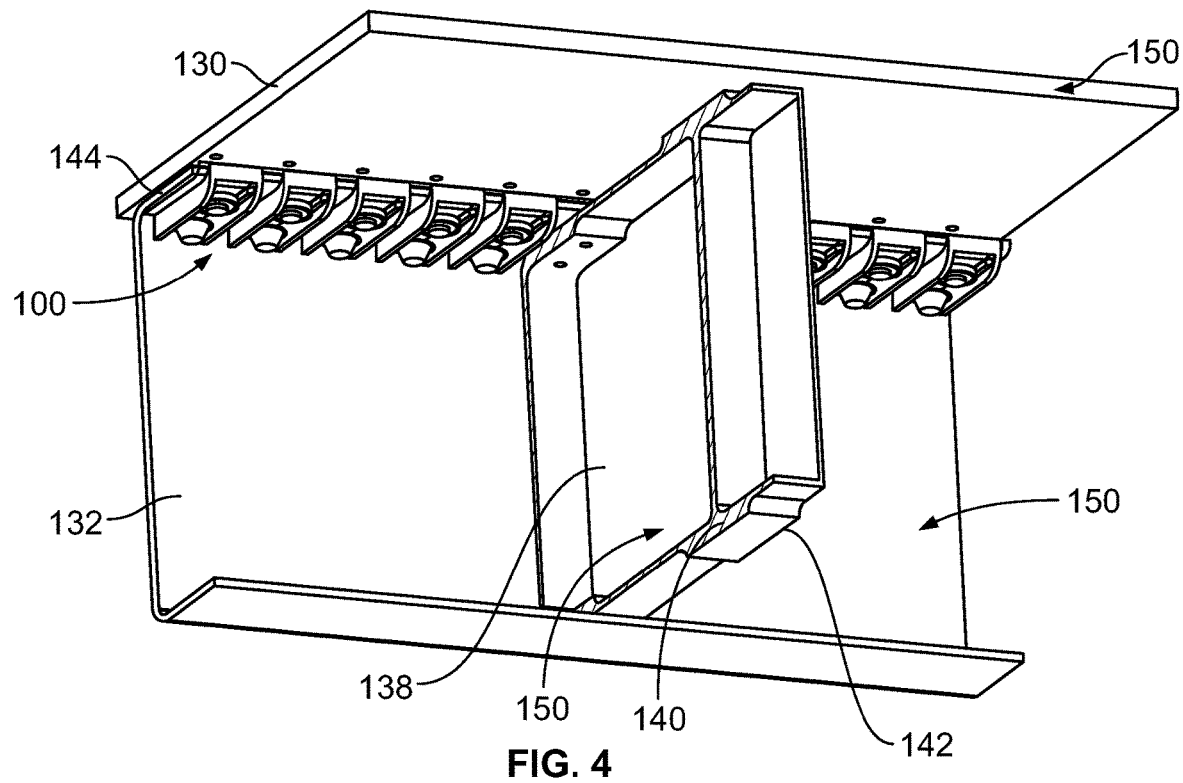
FIG. 4 is a bottom perspective view of the nut plate assembly in accordance with an example positioned relative to the mounting structures.

FIG. 3 is a top perspective view of the nut plate assembly 100 in accordance with an example positioned relative to mounting structures 150. FIG. 4 is a bottom perspective view of the nut plate assembly 100 in accordance with an example positioned relative to the mounting structures 150.

The mounting structures 150 may be structures of the aircraft 110 (shown in FIG. 1) in various examples. In the illustrated example, the mounting structures 150 include the wing rib 138, the wing spar 132, and the wing panel 130 (the wing panel 130 is removed in FIG. 3 to illustrate the nut plate assembly 100).

The nut plate assembly 100 is used to mechanically connect the wing panel 130 to the wing spar 132. In an example, the nut plate assembly 100 is mounted to the wing rib 138 to position the nut plate assembly 100 relative to the wing spar 132. For example, the nut plate assembly 100 is coupled to a mounting surface of the wing rib 138 proximate to an end of the wing rib 138. The nut plate assembly 100 may be centered over the wing rib 138 with a first portion of the nut plate assembly 100 extending to a first side 140 of the wing rib 138 and a second portion of the nut plate assembly 100 extending to a second side 142 of the wing rib 138. The nut plate assembly 100 is cantilevered in both directions from the wing rib 138. For example, the nut plate assembly 100 may extend mid-bay to mid-bay on opposite sides of the wing rib 138. Other nut plate assemblies 100 may be arranged adjacent to the nut plate assembly 100, such as being coupled to adjacent wing ribs 138 (not shown).

During assembly of the wing assembly 116, the nut plate assembly 100 may be mounted to the wing ribs 138 and loaded into position relative to the wing spar 132 with the wing rib 138. In other examples, the nut plate assembly 100 may be mounted to the wing rib 138 prior to the wing spar 132 being positioned at the wing rib 138. In the illustrated example, the nut plate assembly 100 is mounted to the top of the wing rib 138 and is used to connect the wing panel 130 to a spar flange 144 at the top of the wing spar 132. The nut plate assemblies 100 may additionally or alternatively be used at the bottom of the wing assembly 116, such as to attach a lower wing panel to the lower spar flange of the wing spar 132. The nut plate assembly 100 is provided at an interior of the wing assembly 116 and holds nuts within the interior of the wing assembly 116 for connecting to fasteners (not shown) assembled from an exterior surface of the wing assembly 116, such as from above the wing panel 130. In an example, the nut plate assembly 100 includes seals to provide sealing between the nut plate assembly 100 and the mounting structures 150 to seal the interior of the wing assembly 116 from the exterior surface of the wing assembly 116. For example, the seal may be a fuel seal of the wing assembly 116 that prevents leakage of fuel from the inner phase of the wing assembly 116 to the exterior surface of the wing assembly 116. In an example, the nut plate assembly 100 provides spark arresting for static discharge, such as from the fasteners to the inner bays of the wing assembly 116. For example, the nut plate assembly 100 has a closed bottom (i.e. a non-conductive nut cap) to cover the fastener passing through the wing panel 130 and the spar flange 144 of the wing spar 132.

Figure 5:
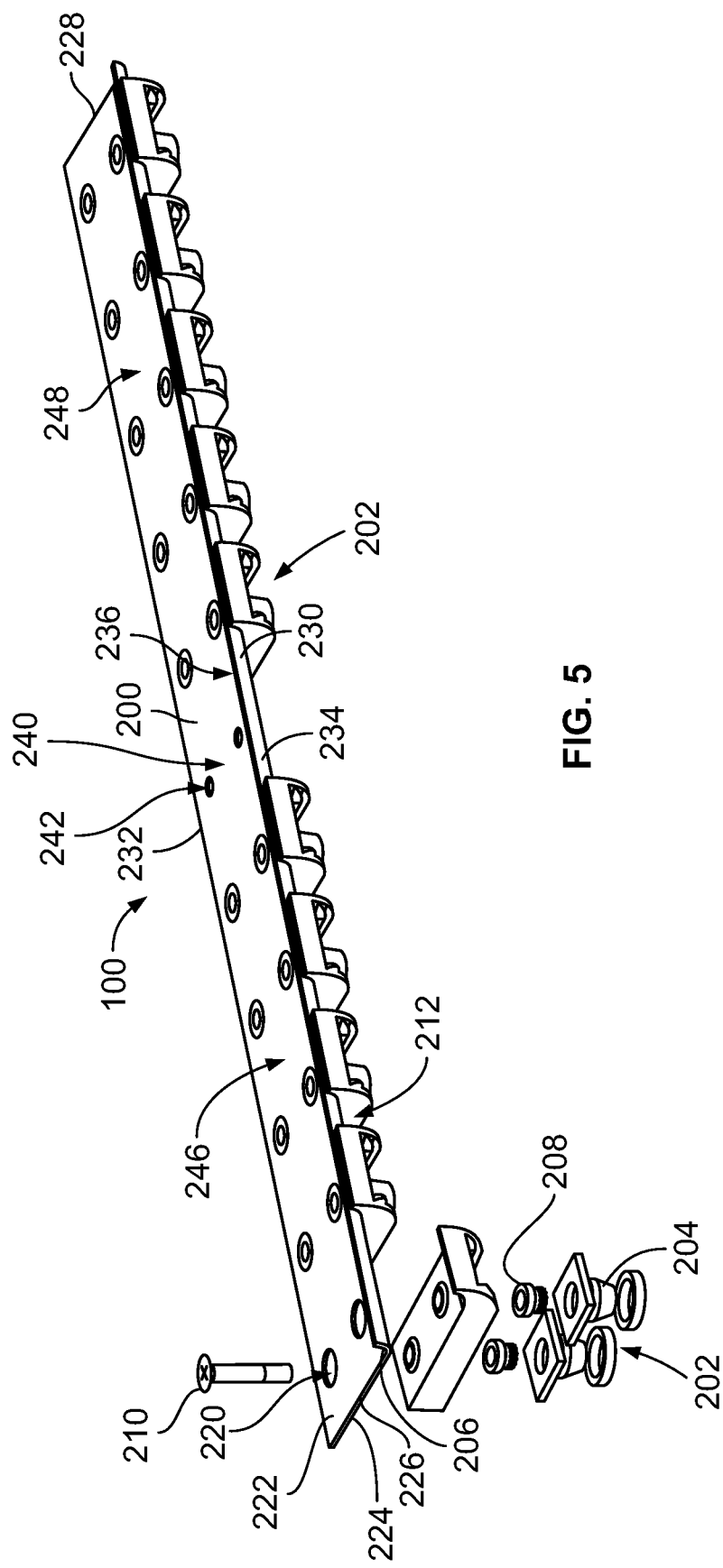
FIG. 5 is a top perspective view of the nut plate assembly in accordance with an example.

FIG. 5 is a top perspective view of the nut plate assembly 100 in accordance with an example. The nut plate assembly 100 includes a base plate 200, a plurality of channel fittings 202 coupled to the base plate 200, and nut caps 204 coupled to the channel fittings 202. The base plate 200 holds a base plate seal 206 configured to be sealed against the mounting structures 150 (shown in FIG. 4). The nut caps 204 hold nuts 208, such as threaded nuts, configured to be coupled to fasteners 210, such as threaded fasteners.

The channel fittings 202 are separate and discrete from each other and are separate and discrete from the base plate 200. The channel fittings 202 are arranged periodically in spaced apart relationship along the base plate 200 and separated from each other by gaps 212. Providing multiple channel fittings 202 at spaced apart locations reduces the overall weight of the nut plate assembly 100 to reduce deflection or bending of the base plate 200 during assembly. In various examples, the channel fittings 202 are adhered to the base plate 200, such as using adhesive. However, the channel fittings 202 may be secured to the base plate 200 by other processes in alternative examples.

The base plate 200 is a plate-like structure having a plurality of base plate openings 220 therethrough. The base plate openings 220 are configured to receive the fasteners 210 to secure the base plate 200 to the mounting structures 150 (for example, to join the wing panel 130 in the wing spar 132). The base plate 200 is manufactured from a material having sufficient stiffness to support the channel fittings 202 and the nut caps 204. For example, the base plate 200 may be manufactured from a carbon fiber reinforced plastic material the base plate 200 may be manufactured from a thermoset plastic material or a thermoplastic material. In other various examples, the base plate 200 may be manufactured from a metal material, such as aluminum.

The base plate 200 has a top 222 and a bottom 224. The top 222 is configured to face the mounting structure 150 (for example, the base plate 200 is configured to be positioned below the mounting structure 150). The channel fittings 202 are mounted to the bottom 224 of the base plate 200. The base plate 200 extends between a first side 226 and a second side 228. The base plate 200 extends between a front edge 230 and a rear edge 232.

In an example, the base plate 200 includes a reinforcement lip 234 at the front edge 230 that forms a seal groove 236 that receives the base plate seal 206. The reinforcement lip 234 extends between the first and second sides 226, 228. The reinforcement lip 234 is non-coplanar with the base plate 200. For example, the reinforcement lip 234 extends upward relative to the base plate 200. In various examples, the reinforcement lip 234 may be a curved lip forming a curved seal groove 236 along the inner surface of the curved lip. Alternatively, the reinforcement lip 234 may be formed by bending the reinforcement lip 234 at an angle relative to the base plate 200, such as perpendicular to the base plate 200. The reinforcement lip 234 provide structural stiffness to the base plate 200 along the length of the base plate 200. In other various examples, the base plate 200 may additionally or alternatively include a reinforcement lip at the rear edge 232.

The base plate 200 includes a mounting area 240 generally centered along the length of the base plate 200 between the first side 226 and the second side 228. The base plate 200 includes mounting openings 242 at the mounting area 240. The mounting openings 242 are configured to receive the fasteners 210 used to secure the nut plate assembly 100 to one of the mounting structures 150, such as the wing ribs 138 (shown in FIG. 4). The nut plate assembly 100 is devoid of channel fittings 202 at the mounting area 240 allowing the bottom 224 of the base plate 200 to be mounted to the wing ribs 138. The base plate 200 includes a first mating area 246 extending between the mounting area 240 and the first side 226. The base plate 200 includes a second mating area 248 extending between the mounting area 240 and the second side 228. The first mating area 246 has a plurality of the base plate openings 220 and a plurality of the channel fittings 202 coupled to the base plate 200 at the first mating area 246. The second mating area 248 has a plurality of the base plate openings 220 and a plurality of the channel fittings 202 coupled to the base plate 200 at the second mating area 248. The first mating area 246 is configured to be cantilevered from the mounting structure 150 (for example, the wing ribs 138) and extend to the first side 226. The first side 226 may face a second side of an adjacent nut plate assembly (not shown) within the wing assembly 116. The second mating area 248 is configured to be cantilevered from the mounting structure 150 and extend to the second side 228. The second side 228 may face a first side of an adjacent nut plate assembly (not shown) within the wing assembly 116.

Figure 6:
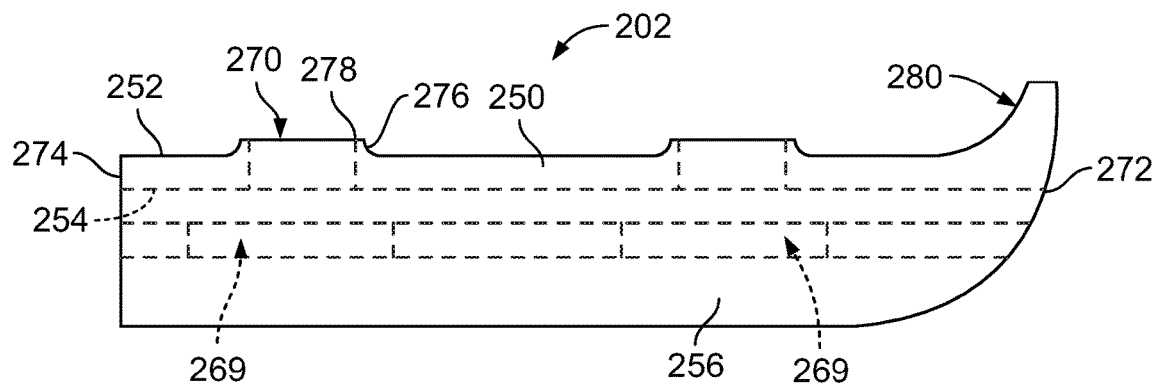
FIG. 6 is a side view of a channel fitting of the nut plate assembly in accordance with an example.
Figure 7:
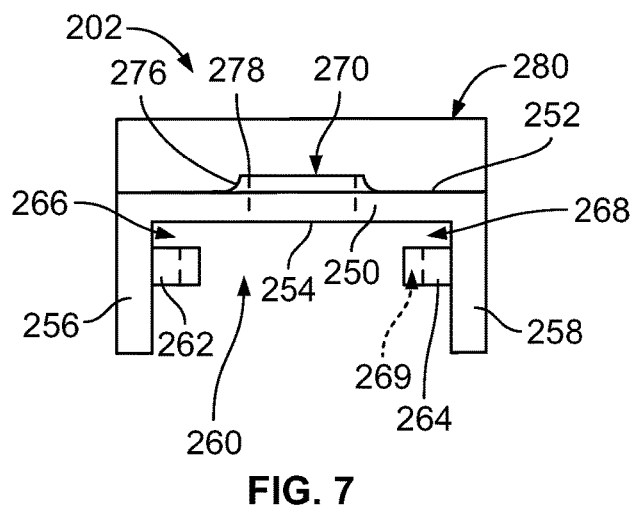
FIG. 7 is an end view of the channel fitting in accordance with an example.

FIG. 6 is a side view of the channel fitting 202 in accordance with an example. FIG. 7 is an end view of the channel fitting 202 in accordance with an example. The channel fitting 202 is used to hold the nut cap 204 (shown in FIG. 8). The channel fitting 202 may be manufactured from a lightweight material to avoid causing sagging of the base plate 200 when mounted to the mounting structure 150 (shown in FIG. 4). The channel fitting 202 may be manufactured from a material having sufficient strength and/or rigidity to provide structural support for the base plate 200. In various examples, the channel fitting 202 may be manufactured from a glass fiber reinforced injection molded plastic, such as polyether ether ketone (PEEK), polyamide, polyimide, and the like.

The channel fitting 202 includes a main body 250 having a top 252 and a bottom 254. The channel fitting 202 includes a first side wall 256 extending from the bottom 254 and a second side wall 258 extending from the bottom 254. The channel fitting 202 includes a nut cap channel 260 between the side walls 256, 258 that receives the nut cap 204. The nut cap channel 260 is located below the bottom 254 of the main body 250. In an example, the channel fitting 202 includes a first rail 262 extending from the first side wall 256 into the nut cap channel 260 and a second rail 264 extending from the second side wall 258 into the nut cap channel 260. The nut cap channel 260 includes a first groove 266 between the first rail 262 and the main body 250 and a second groove 268 between the second rail 264 and the main body 250. The nut cap 204 is configured to be received in the first groove 266 and the second groove 268. Optionally, the nut cap channel 260 is open at the front of the channel fitting 202 to receive the nut cap 204 through the open front. However, the nut cap channel 260 may be open at the rear of the channel fitting 202 or may be open from above or from below to receive the nut cap 204. In various examples, the first and second rails 262, 264 may include notches 269 (shown in phantom) configured to receive a portion of the nut cap 204 or a retaining ring for the nut cap 204.

The channel fitting 202 includes one or more openings 270 through the main body 250 configured to receive the fastener 210 (shown in FIG. 5). The opening 270 passes through the main body 250 between the top 252 and the bottom 254. In the illustrated example, the channel fitting 202 includes a pair of openings 270, with one of the openings 270 positioned closer to a front 272 of the main body 250 and the other opening 270 positioned closer to a rear 274 of the main body 250. The channel fitting 202 may include greater or fewer openings 270 in alternative examples. The channel fitting 202 includes a rim 276 surrounding the opening 270. Optionally, the rim 276 may be elevated above the top 252 of the main body 250, such as to extend into the base plate 200 (shown in FIG. 5). In an example, the channel fitting 202 includes a rim seal 278 around the edge of the rim 276 to seal the channel fitting 202 to the mounting structure 150 (shown in FIG. 4). Optionally, the rim seal 278 may be separate rim seal, such as an O-ring or gasket coupled to the rim 276. Alternatively, the rim seal 278 may be integral with the channel fitting 202, such as co-molded with the main body 250. For example, the rim 276 may be thin at the edge to form a compressible or deformable rim seal.

The channel fitting 202 includes a front support wall 280 at the front 272. The front support wall 280 extends upward from the top 252 of the main body 250. The front support wall 280 is configured to engage and provide support to the reinforcement lip 234 (shown in FIG. 5) of the base plate 200. The front support wall 280 may have a curved profile (i.e. a curved wall) in various examples.

Figure 8:
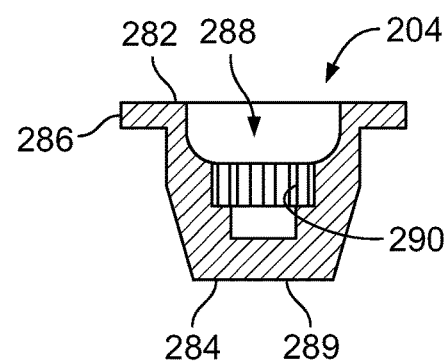
FIG. 8 is a cross-sectional view of a nut cap of the nut plate assembly in accordance with an example.

FIG. 8 is a cross-sectional view of the nut cap 204 in accordance with an example. The nut cap 204 extends between a top 282 and a bottom 284. The nut cap 204 includes a flange 286 at the top 282 operating as a nut cap retainer. The flange 286 is configured to be received in the first and second grooves 266, 268 of the nut cap channel 260 (shown in FIG. 7). The nut cap 204 includes a pocket 288 that receives the nut 208. In an example, the pocket 288 is open at the top 282 and is closed at the bottom 284 by a base 289 of the nut cap 204. For example, the body of the nut cap 204 surrounds the pocket 288 around the outside of the pocket 288 and at the bottom of the pocket 288. The base 289 isolates the nut 208 and the fastener 210 from the interior of the wing assembly 116 to operate as a spark arrest feature for static discharge.

In an example, the nut cap 204 includes a locating feature 290 for locating the nut 208 in the pocket 288. The locating feature 290 engages the nut 208 to hold the nut 208 from moving in the pocket 288, such as for receiving the fastener 210 from above. The locating feature 290 may be a surface of the pocket 288, such as a flat surface used to engage and hold the nut 208. The locating feature 290 may be defined by a groove extending into the side wall of the nut cap 204 or a protrusion extending from the side wall of the nut cap 204 into the pocket 288 to engage the nut 208.

Figure 9:
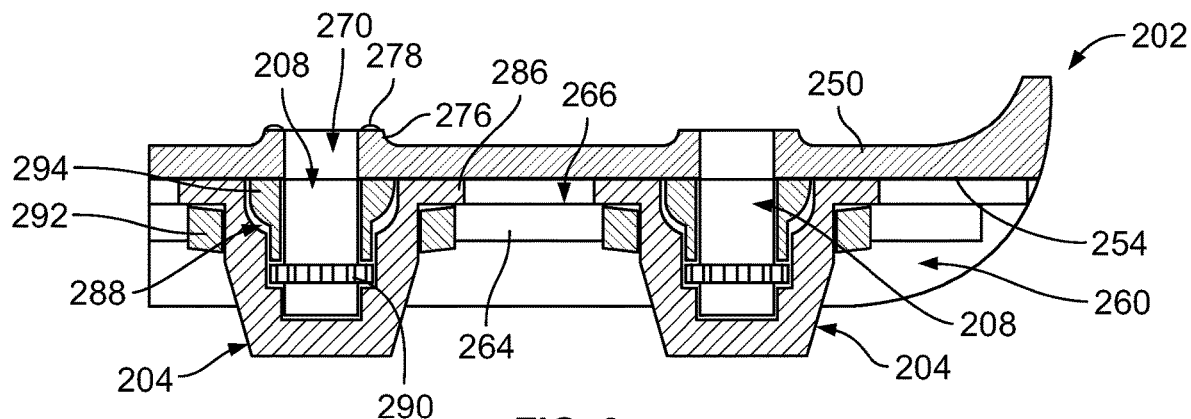
FIG. 9 is a cross-sectional view of the channel fitting and the nut cap coupled to the channel fitting.

FIG. 9 is a cross-sectional view of the channel fitting 202 and the nut caps 204 coupled to the channel fitting 202. The nut caps 204 are aligned with the openings 270 in the channel fitting 202. The flange 286 of each nut cap 204 is received in the nut cap channel 260, such as in the groove 266. The rail 264 supports the flange 286 between the rail 264 and the bottom 254 of the main body 250. In an example, a retaining ring 292 surrounds the nut cap 204 to retain the nut cap 204 in the nut cap channel 260. For example, the retaining ring 292 is received in the notch 269 (shown in FIGS. 6 and 7).

When assembled, the pocket 288 of the nut cap 204 is aligned with the opening 270 in the main body 250. The nut 208 is received in the pocket 288. The nut 208 is located in the pocket 288 by the locating feature 290. In an example, the nut 208 includes a nut seal 294 at a top of the nut 208. The nut seal 294 may be at least partially received in the pocket 288 and/or may be at least partially received in the opening 270. In various examples, the nut seal 294 may extend into the rim 276, such as being coplanar with the rim seal 278. The nut seal 294 may be sealed to the nut cap 204 and/or the main body 250 of the channel fitting 202 and/or the mounting structure 150 (shown in FIG. 4).

Figure 10:
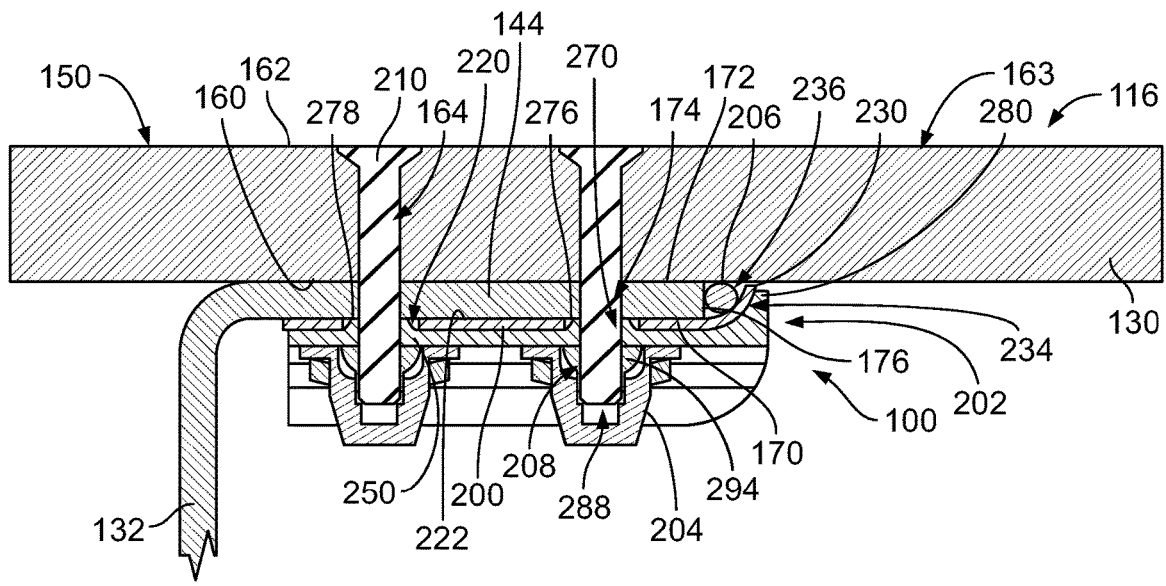
FIG. 10 is a side cross-sectional view of the nut plate assembly mounted to the mounting structures.
Figure 11:
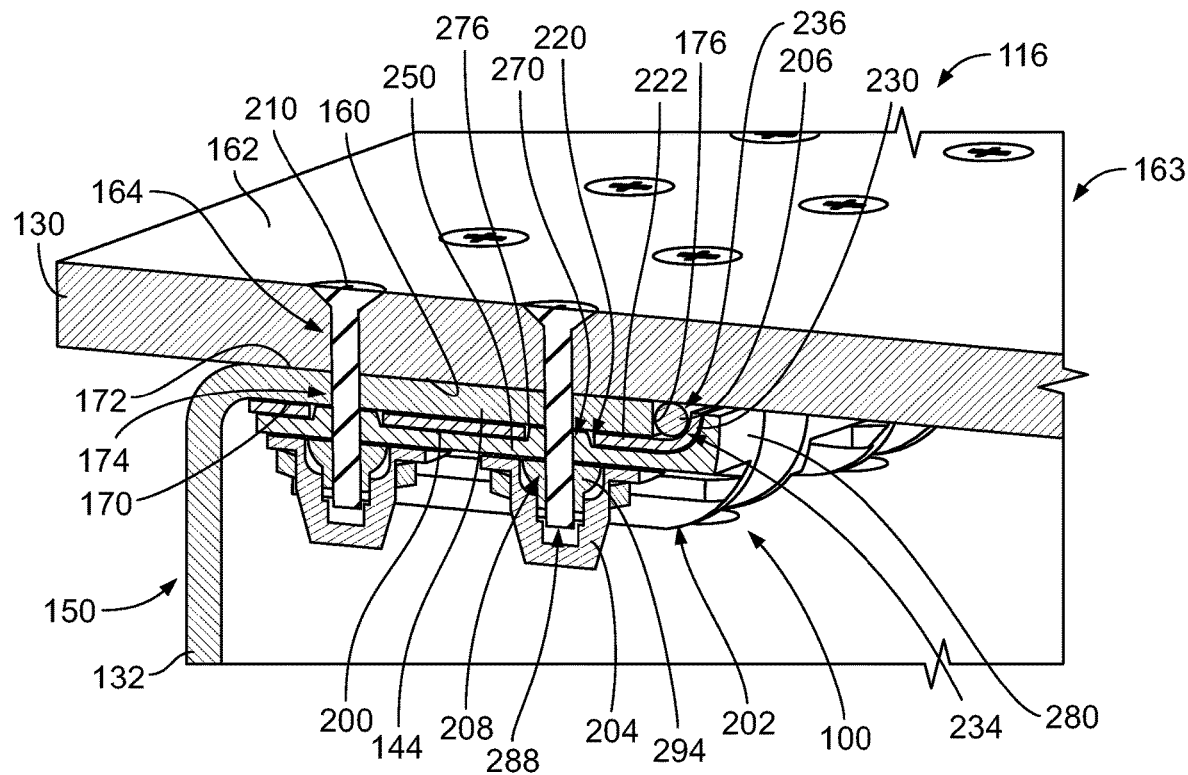
FIG. 11 is a perspective, partial sectional view of the nut plate assembly mounted to the mounting structures.

FIG. 10 is a side cross-sectional view of the nut plate assembly 100 mounted to the mounting structures 150. FIG. 11 is a perspective, partial sectional view of the nut plate assembly 100 mounted to the mounting structures 150. In the illustrated example, the nut plate assembly 100 is coupled to the spar flange 144 of the wing spar 132 and the wing panel 130. When the nut plate assembly 100 is assembled, the channel fitting 202 is coupled to the base plate 200. The front support wall 280 extends along and provides support for the reinforcement lip 234. When the nut plate assembly 100 is assembled, the nut caps 204 and the openings 270 in the channel fitting 202 are aligned with the base plate openings 220 to receive the fasteners 210. The fasteners 210 are used to securely couple the wing panel 130 to the wing spar 132.

The wing panel 130 includes an inner surface 160 and an outer surface 162. In various examples, the inner surface 160 may be a bottom surface of the wing panel 130 and the outer surface 162 may be a top surface of the wing panel 130. The wing panel 130 forms an exterior structure of the wing assembly 116 such that the outer surface 162 of the wing panel 130 defines an exterior surface 163 of the wing assembly 116. The fasteners 210 are configured to be coupled to the wing panel 130 from the exterior surface of the wing assembly 116. The wing panel 130 includes wing panel openings 164 extending therethrough between the inner surface 160 and the outer surface 162. Optionally, the wing panel openings 164 may be chamfered at the outer surface 162 to countersink or flush mount the fasteners 210 and the wing panel openings 164.

The spar flange 144 of the wing spar 132 includes an inner surface 170 and an outer surface 172. In various examples, the inner surface 170 may be a bottom surface of the spar flange 144 and the outer surface 172 may be a top surface of the spar flange 144. The wing spar 132 is positioned interior of the wing panel 130 such that the outer surface 172 of the spar flange 144 faces the inner surface 160 of the wing panel 130. The spar flange 144 of the wing spar 132 includes spar flange openings 174 therethrough between the inner surface 170 and the outer surface 172. The spar flange openings 174 are aligned with the wing panel openings 164. The spar flange 144 extends to a spar flange edge 176.

The nut plate assembly 100 is positioned relative to the mounting structures 150 such that the base plate openings 220, the openings 270 and the nut caps 204 are aligned with the spar flange openings 174 and the wing panel openings 164 to receive the fasteners 210. The reinforcement lip 234 at the front edge 230 extends forward of the spar flange edge 176 to form the seal groove 236. The reinforcement lip 234 and the front support wall 280 provide structural stiffness for the base plate 200, such as to prevent sagging or drooping of the base plate 200 away from the mounting structures 150 prior to installing the fasteners 210. In an example, the top 222 of the base plate 200 faces the inner surface 170 of the spar flange 144 of the wing spar 132. The nut plate assembly 100 is located below the mounting structures 150 at the interior of the wing assembly 116. The nut plate assembly 100 positions the nuts 208 for mating with the fasteners 210, which are installed from the exterior surface of the wing assembly 116. The nut caps 204 enclose the pockets 288 to retain the nuts 208 therein and to provide spark arresting features to isolate the fasteners 210 and the nuts 208 from the interior of the wing assembly 116.

The seal groove 236 receives the base plate seal 206 between the base plate 200 and the mounting structures 150. In the illustrated example, the base plate seal 206 is sealed to the base plate 200, the spar flange 144 of the wing spar 132 and the wing panel 130. For example, the base plate seal 206 may have a seal interface against the top 222 of the base plate 200 and/or against the reinforcement lip 234, a seal interface against the spar flange edge 176 and/or against the inner surface 170 of the spar flange 144, and a seal interface against the inner surface 160 of the wing panel 130. The base plate seal 206 may be sealed against other surfaces of the mounting structures 150 in alternative examples. For example, when the fasteners 210 are tightened to the nuts 208, the base plate seal 206 may be compressed against the spar flange edge 176 and/or the inner surface 160 of the wing panel 130. In an example, the rims 276 of the channel fitting 202 may extend into the base plate openings 220. The rims seals 278 may seal against the inner surface 170 of the spar flange 144 of the wing spar 132. For example, when the fasteners 210 are tightened to the nuts 208, the rims seals 278 may be compressed against the inner surface 170 of the spar flange 144. In an example, the nut seals 294 are sealed to the fasteners 210 and/or the nut caps 204 and/or the main body 250 of the channel fitting 202. For example, the nut seals 294 may be compressed against the channel fitting 202 and/or the nut caps 204 when the fasteners 210 are tightened to the nuts 208. The base plate seal 206 and/or the rim seal 278 and/or the nut seal 294 seal the interior structures and compartments of the wing assembly 116 from the exterior surface of the wing assembly 116.

It is to be understood that the above description is intended to be illustrative, and not restrictive. For example, the above-described examples (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain examples, and are by no means limiting and are merely examples. Many other examples and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A nut plate assembly comprising:
a base plate having a top and a bottom, the top configured to face an inner surface of a mounting structure, the base plate having base plate openings therethrough, the base plate having a first side and a second side, the base plate having a front edge and a rear edge;
channel fittings coupled to the bottom of the base plate, each channel fitting including a main body having a top and a bottom, the top of the main body facing the bottom of the base plate, the main body having an opening aligned with a corresponding base plate opening of the base plate openings in the base plate, each channel fitting having a nut cap channel at the bottom of the main body aligned with the opening in the main body; and
nut caps coupled to the channel fittings and positioned below the bottom of the main body, the nut caps received in the nut cap channels of the channel fittings, each nut cap having a pocket open at a top of said nut cap, the pocket to hold a nut aligned with the opening in the main body and the corresponding base plate opening to receive a fastener, used to secure the base plate to the mounting structure from an exterior surface of the mounting structure, through the base plate and the main body of a channel fitting of the channel fittings.

2. The nut plate assembly of claim 1, wherein each nut cap includes a base below the pocket forming a closed bottom to retain the nut in the pocket.

3. The nut plate assembly of claim 1, wherein each nut cap includes a locating feature in the pocket to engage the nut to prevent movement of the nut in the pocket to receive the fastener from the exterior surface of the mounting structure.

4. The nut plate assembly of claim 1, wherein the base plate includes a reinforcement lip at the front edge of the base plate, the reinforcement lip being non-coplanar with the base plate and extending between the first side and the second side.

5. The nut plate assembly of claim 4, wherein each channel fitting includes a front support wall to engage the reinforcement lip to support the reinforcement lip.

6. The nut plate assembly of claim 4, wherein the reinforcement lip is a curved wall extending from the base plate at the front edge.

7. The nut plate assembly of claim 1, wherein the base plate includes a reinforcement lip at the front edge of the base plate forming a seal groove, the nut plate assembly further comprising a base plate seal received in the seal groove.

8. The nut plate assembly of claim 1, wherein the nut includes a nut seal configured to seal at least one of the fastener and the main body of the channel fitting.

9. The nut plate assembly of claim 1, wherein the channel fitting includes a rim around the opening, the channel fitting including a rim seal around the rim configured to seal to the inner surface of the mounting structure.

10. The nut plate assembly of claim 1, further comprising a base plate seal between the top of the base plate and the inner surface of the mounting structure.

11. The nut plate assembly of claim 1, wherein the channel fittings are arranged in a spaced apart relationship along the base plate with gaps between the channel fittings.

12. The nut plate assembly of claim 1, wherein the base plate includes a first mating area and a second mating area, the first mating area having a plurality of the base plate openings and a plurality of the channel fittings therein, the second mating area having a plurality of the base plate openings and a plurality of the channel fittings therein, the base plate including a mounting area between the first and second mating areas, the mounting area configured to be mounted to a second mounting structure, the first mating area being cantilevered from the second mounting structure and the first mating area extending to the first side, the second mating area being cantilevered from the second mounting structure and the second mating area extending to the second side.

13. The nut plate assembly of claim 1, wherein each nut cap channel is open at a front of each channel fitting to receive each nut cap.

14. The nut plate assembly of claim 1, wherein each nut cap channel includes a first rail defining a first groove and a second rail defining a second groove, each nut cap including a flange at the top of the nut cap to be received in the first and second grooves and to be supported by the first and second rails.

15. The nut plate assembly of claim 14, wherein each nut cap further comprises a nut cap retainer coupled to the first and second rails to secure the nut cap to the first and second rails.

16. The nut plate assembly of claim 1, wherein each main body extends between a front and a rear, the opening positioned along the main body closer to the front than the rear, each main body further comprising a second opening along the main body closer to the rear than the front and aligned with a corresponding base plate opening to receive a second fastener, each nut cap being aligned with the opening and the second opening.

17. A nut plate assembly comprising:
- a base plate having a top and a bottom, the top configured to face an inner surface of a mounting structure, the base plate having base plate openings therethrough, the base plate having a first side and a second side, the base plate having a front edge and a rear edge, the base plate having a reinforcement lip at the front edge forming a seal groove;
- a base plate seal received in the seal groove configured to seal between the base plate and the mounting structure;
- channel fittings coupled to the bottom of the base plate, each channel fitting including a main body having a top and a bottom, the top of the main body facing the bottom of the base plate, the channel fitting having a front support wall extending along and supporting the reinforcement lip of the base plate, the main body having an opening aligned with a corresponding base plate opening of the base plate openings in the base plate, each channel fitting having a nut cap channel at the bottom of the main body aligned with the opening in the main body; and
- nut caps received in the nut cap channels of the channel fittings, each nut cap having a pocket to hold a nut aligned with the opening in the main body and the corresponding base plate opening to receive a fastener used to secure the base plate to the mounting structure.

18. The nut plate assembly of claim 17, wherein each channel fitting includes a rim around the opening, said channel fitting including a rim seal around the rim configured to seal to the inner surface of the mounting structure.

19. A wing assembly comprising:
- a wing spar having a spar flange including an inner surface and an outer surface, the spar flange having spar flange openings;
- a wing panel having an inner surface and an outer surface, the inner surface of the wing panel facing the outer surface of the spar flange, the wing panel having wing panel openings aligned with the spar flange openings;
- a nut plate assembly extending along the inner surface of the spar flange, the nut plate assembly including a base plate having a top and a bottom, the top facing the inner surface of the spar flange, the base plate having base plate openings aligned with the spar flange openings, the base plate having a first side and a second side, the base plate having a front edge and a rear edge, the nut plate assembly including channel fittings coupled to the bottom of the base plate, each channel fitting including a main body having a top and a bottom, the top of the main body facing the bottom of the base plate, the main body having an opening aligned with a corresponding base plate opening of the base plate openings, each channel fitting having a nut cap channel at the bottom of the main body aligned with the opening in the main body, the nut plate assembly including nut caps coupled to the channel fittings and positioned below the bottom of the main body, the nut caps received in the nut cap channels of the channel fittings, each nut cap having a pocket open at a top of the nut cap, the pocket holding a nut aligned with the opening in the main body; and
- fasteners passing through the wing panel openings, the spar flange openings and the main body openings into the nut caps from an exterior surface of the wing panel, the fasteners secured to corresponding nuts of the nut plate assembly to secure the wing panel to the spar flange.

20. The wing assembly of claim 19, further comprising a wing rib having a mounting surface proximate to an end of the wing rib, the end of the wing rib facing the wing spar, the bottom of the base plate being mounted to the mounting surface of the wing rib, the bottom of the base plate extending from a first side of the wing rib to the first side of the base plate, the bottom of the base plate extending from a second side of the wing rib to the second side of the base plate.

* * * * *